US012576561B2

(12) United States Patent
Winterowd et al.

(10) Patent No.: US 12,576,561 B2
(45) Date of Patent: Mar. 17, 2026

(54) PVC INFUSED COMPOSITE PRODUCTS

(71) Applicant: Continuus Materials Intellectual Property, LLC, The Woodlands, TX (US)

(72) Inventors: Jack G. Winterowd, Puyallup, WA (US); Matthew Spencer, Palatine, IL (US)

(73) Assignee: CONTINUUS MATERIALS INTELLECTUAL PROPERTY, LLC, The Woodlands, TX (US)

( * ) Notice: Subject to any disclaimer, the term of this patent is extended or adjusted under 35 U.S.C. 154(b) by 419 days.

(21) Appl. No.: 18/217,113

(22) Filed: Jun. 30, 2023

(65) Prior Publication Data

US 2025/0001750 A1     Jan. 2, 2025

(51) Int. Cl.
| | |
|---|---|
| *B29B 17/00* | (2006.01) |
| *B29B 17/04* | (2006.01) |
| *B29C 43/00* | (2006.01) |
| *B29K 27/06* | (2006.01) |
| *B29K 105/26* | (2006.01) |
| *B29K 201/00* | (2006.01) |
| *B29K 311/12* | (2006.01) |
| *B29K 311/14* | (2006.01) |

(Continued)

(52) U.S. Cl.
CPC .......... *B29B 17/0042* (2013.01); *B29B 17/04* (2013.01); *B29C 43/003* (2013.01); *B32B 27/06* (2013.01); *B32B 27/18* (2013.01); *B32B 27/304* (2013.01); *B32B 37/10* (2013.01); *B32B 37/15* (2013.01); *B29B 2017/042* (2013.01); *B29K 2027/06* (2013.01); *B29K 2105/26* (2013.01); *B29K 2201/00* (2013.01); *B29K 2311/12* (2013.01); *B29K 2311/14* (2013.01); *B32B 2250/03* (2013.01); *B32B*

*2250/40* (2013.01); *B32B 2264/10* (2013.01); *B32B 2272/00* (2013.01); *B32B 2317/12* (2013.01); *B32B 2327/06* (2013.01); *Y02W 30/62* (2015.05)

(58) Field of Classification Search
CPC ............ B29B 17/0042; B29K 2201/00; B29K 2311/12; B29K 2311/14; B29K 2105/26; Y02W 30/62
See application file for complete search history.

(56) References Cited

U.S. PATENT DOCUMENTS

| | | | | | |
|---|---|---|---|---|---|
| 5,993,534 | A | * | 11/1999 | Winterowd | ............ C09D 5/028 524/436 |
| 6,500,373 | B1 | | 12/2002 | Konishi | |

(Continued)

FOREIGN PATENT DOCUMENTS

| | | |
|---|---|---|
| CA | 2180882 A1 | 1/1998 |
| EP | 0 731 232 A2 | 9/1996 |

(Continued)

OTHER PUBLICATIONS

Foreign Action other than Search Report on CA DTD Jul. 7, 2025.

(Continued)

*Primary Examiner* — John J DeRusso
(74) *Attorney, Agent, or Firm* — FOLEY & LARDNER LLP

(57) ABSTRACT

A method of manufacturing a product includes forming a first mixture of PVC fragments and cellulosic fragments, heating the first mixture at a temperature and duration sufficient to melt at least a portion of the PVC fragments, and cooling the first mixture until the melted PVC fragments resolidify.

27 Claims, 5 Drawing Sheets

(51) Int. Cl.

| | | |
|---|---|---|
| *B32B 27/06* | (2006.01) | |
| *B32B 27/18* | (2006.01) | |
| *B32B 27/30* | (2006.01) | |
| *B32B 37/10* | (2006.01) | |
| *B32B 37/15* | (2006.01) | |

(56) References Cited

U.S. PATENT DOCUMENTS

| | | | |
|---|---|---|---|
| 2002/0113340 A1* | 8/2002 | Reetz ........................ | D04H 1/66 264/320 |
| 2006/0006564 A1 | 1/2006 | Maldas et al. | |
| 2009/0326084 A1 | 12/2009 | Olsson | |
| 2022/0162431 A1* | 5/2022 | Hara ........................ | B29B 7/007 |
| 2023/0173713 A1* | 6/2023 | Fisher .................... | B29B 17/04 264/331.11 |

FOREIGN PATENT DOCUMENTS

| | | | | |
|---|---|---|---|---|
| EP | 1 207 740 B1 | 12/2006 | | |
| EP | 4 039 435 A1 | 8/2022 | | |
| WO | WO-2007085836 A1 * | 8/2007 | ............. | B29C 48/08 |

OTHER PUBLICATIONS

Extended European Search Report for EP24185552.7, dated Mar. 5, 2025.
Schyns, et al., "Mechanical Recycling of Packaging Plastics: A Review", Macromolecular Rapid Communications, vol. 42, No. 3, Sep. 30, 2020 (Sep. 30, 2020), p. 2000415.

* cited by examiner

100 —

102 —

106 —

104 —

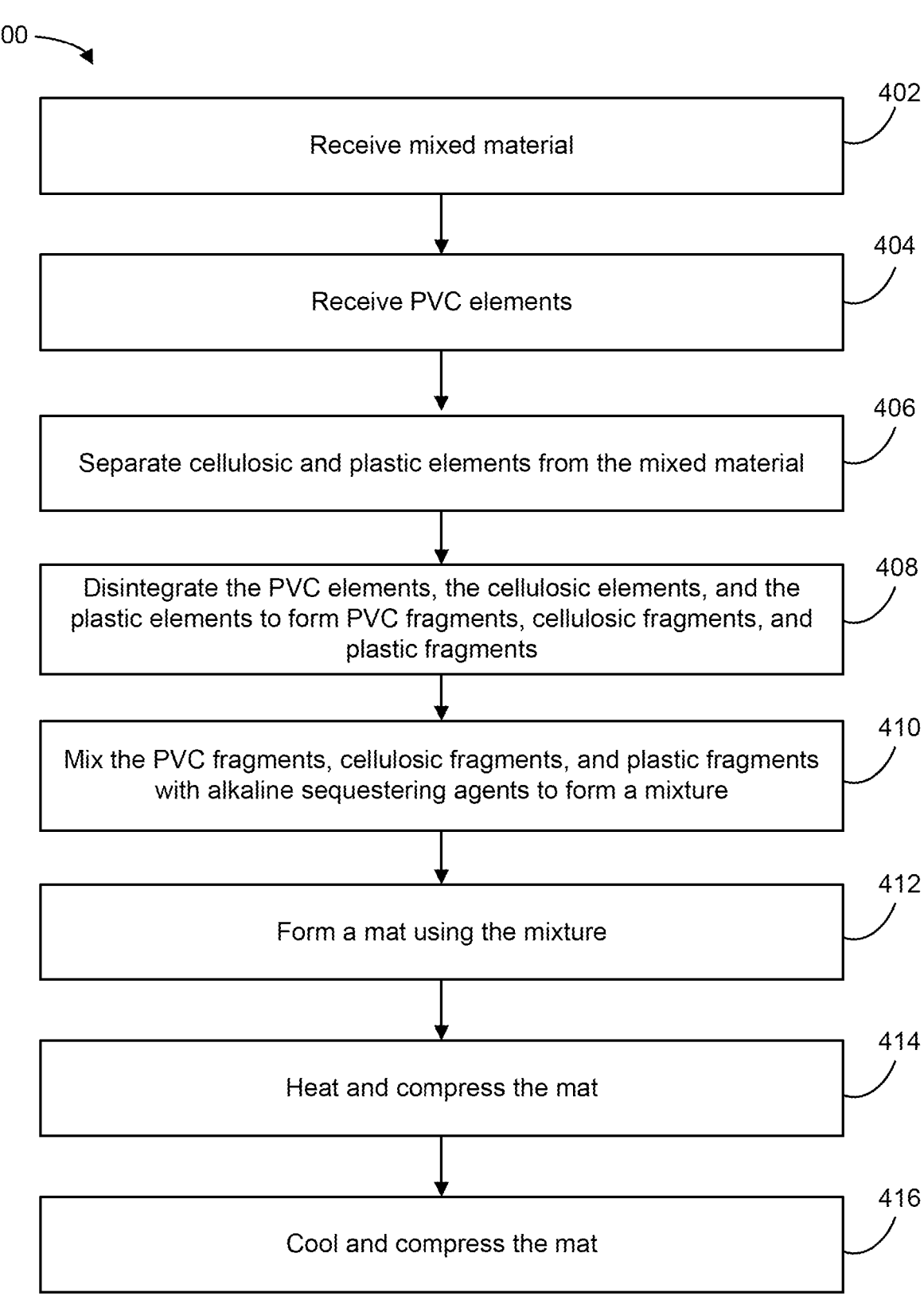

400

402
Receive mixed material

404
Receive PVC elements

406
Separate cellulosic and plastic elements from the mixed material

408
Disintegrate the PVC elements, the cellulosic elements, and the plastic elements to form PVC fragments, cellulosic fragments, and plastic fragments 410
Mix the PVC fragments, cellulosic fragments, and plastic fragments with alkaline sequestering agents to form a mixture 412
Form a mat using the mixture 414
Heat and compress the mat 416
Cool and compress the mat

FIG. 5

PVC INFUSED COMPOSITE PRODUCTS

BACKGROUND

Effective and environmentally sound waste disposal is a common dilemma faced by most industrialized and developing nations. In recent history, waste has primarily been disposed of in landfills, which require substantial tracts of land that might otherwise be used for other meaningful purposes. Regulatory and political bodies, as well as generators of waste, are increasingly interested in reducing waste volumes, diverting waste from landfills and incinerators while promoting more sustainable usage of waste products. Unfortunately, despite efforts of governments and communities to institute and promote waste recycling programs, there remains a tremendous amount of recyclable material that is not recycled.

There is a critical need to utilize this vast resource of waste material and at the same time save the land now occupied as landfill space. It is therefore desirable to develop technologies that not only reduce the amount of waste destined for a landfill or incinerator, but also to capture and use such material for beneficial purposes

BRIEF DESCRIPTION OF THE DRAWINGS

FIG. 5 is a flow diagram of an example process for forming a composite board, in accordance with some embodiments of the present disclosure.

Figure 1:
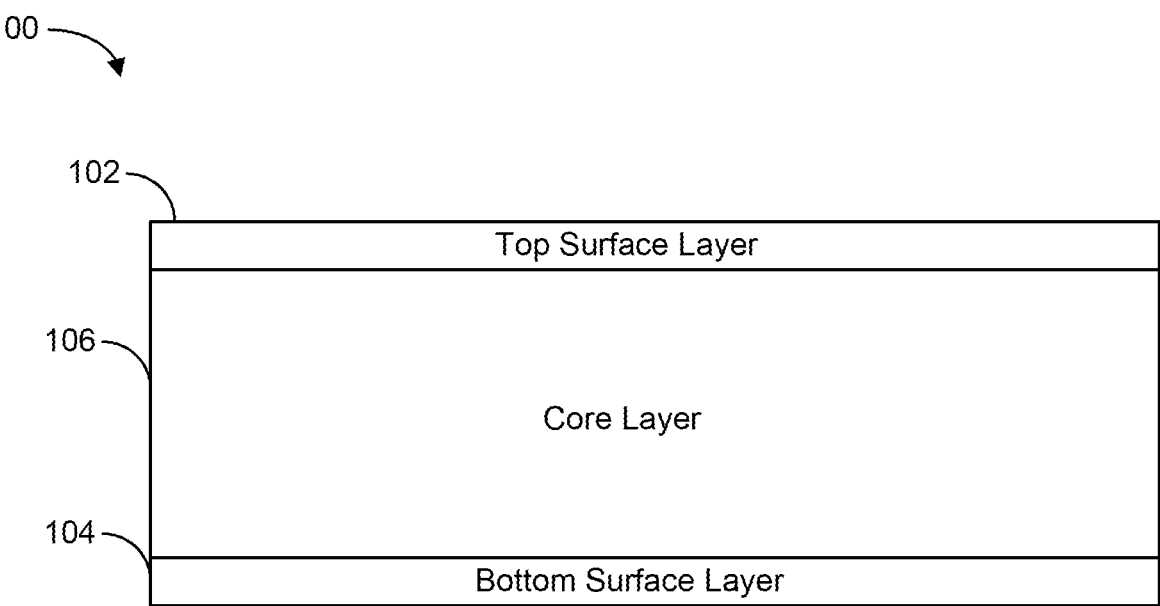
FIG. 1 is an example composite mat, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Current solutions to reducing the amount of waste stored in landfills or burned in incinerators often involve converting the waste into a useful product. For instance, in one example, the waste may be captured, melted, and congealed into a composite board comprising a mixture of the captured waste. If the composite board is properly melted and congealed, the composite board may be capable of being exposed to outdoor elements (e.g., sun, rain, snow, sleet, temperature changes, heat, cold, etc.) for prolonged time periods without any substantial deformations. Construction companies may use such composite boards to build roofing and/or side paneling for houses or large buildings. Thus, instead of taking up space in landfills that are increasingly overflowing, waste may be manipulated by manufacturers into a composite board that can benefit many different types of consumers (e.g., homeowners, companies working in offices, warehouse owners, etc.).

One sample process for manufacturing composite boards is described in U.S. patent application Ser. No. 17/069,567, filed Oct. 13, 2020, the entirety of which is incorporated by reference herein. This process generally involves forming a mat comprised of fragments. In some cases, the fragments may be a mixture of discrete paper fragments (e.g., cellulosic fragments) and/or plastic fragments (e.g., thermoplastic polymer fragments). In other cases, each fragment may be comprised of separate layers of paper and thermoplastic polymer. The mat may include paper/plastic fragments sandwiched between top and bottom layers (e.g., facer layers). These top and bottom layers may include paper, fiberglass, films, and/or other nonwovens or facer fabrics. Thermoplastic adhesive layers may be positioned between the paper/plastic fragment-based core and the top and bottom surface layers. The mat may be assembled in a relatively cold state and the spatial order of the components may be mostly preserved throughout the subsequent thermal processing steps. The moisture content of the mat can range from about 0 percent to about 25 percent, or between about 1 percent and 20 percent. The mat is first subjected to a hot-pressing step under conditions that compress the mat and melt a significant portion of the thermoplastic polymer, especially fragments made of polyethylene. In a subsequent step, the hot mat may be subjected to a cold-pressing step under conditions that simultaneously maintain the compressed state of the mat and congeal (e.g., freeze) the molten thermoplastic in the mat. In some systems, a mat of paper and plastic may be continuously deposited onto a moving conveyor belt and moved through a continuous hot press. The hot press may include continuous heated belts, usually made of steel, above and below the mat that are heated to temperatures as high as 250 degrees Celsius. The continuous steel belts may move at approximately the same speed as a conveyor belt such that the mat of paper and plastic is continuously fed into and pressed by the heated belts. In other systems, a mat may be pressed between hot platens in a stationary press to melt the thermoplastic polymer, then pressed between cold platens in a stationary press to congeal the thermoplastic polymer.

Thermoplastic materials that may be used to form a composite board or other product may include polyethylene, polypropylene, copolymers of ethylene and propylene, thermoplastic polyolefin (TPO), and polystyrene. Thermoplastic materials with melt-point values (e.g., melting temperatures) in the range of about 90 degrees Celsius to about 165 degrees Celsius may be preferred. Thermoplastic polymers with melt-point values in the lower portion of this range may allow for products such as composite boards to be manufactured more quickly and using less energy, as the corresponding temperature of the hot presses may be lower.

Another type of polymer that can be used in the manufacture of composite boards and other products is polyvinylchloride (PVC). PVC is the third-most abundant synthetic polymer on the planet (after polyethylene and polypropylene). Currently, there are no prominent technologies for recycling or reusing PVC material. PVC waste is typically disposed of in landfills or incinerated. Incineration of PVC can result in the formation of polychlorinated dioxin-like compounds, which may be environmentally persistent and carcinogenic. Accordingly, a method of reusing or recycling PVC waste would be desirable. The use of PVC in the manufacture of composite boards and other products could reduce the amount of waste in landfills and prevent the release of harmful chemicals due to PVC incineration.

Pure PVC is often referred to as rigid PVC or PVC-U (un-plasticized PVC). PVC-U is commonly used in rigid pipe, rigid conduit, and window and door applications in which PCV-U is used as frame and casing material. PVC-U has a melt-point of about 200 degrees Celsius. This relatively high melt-point may require longer processing times and relatively high platen temperature values when PVC-U is used to form a paper and plastic composite board or other product.

Flexible PVC, another type of PVC, is a plastisol comprised of a mixture of PVC and plasticizer. The plasticizer in the flexible PVC can constitute about 10 to about 80 percent of the mixture. The addition of the plasticizer yields a material that is softer and more flexible than PVC-U. The addition of plasticizer also results in a lower melt-point value than that of PVC-U. For example, flexible PVC with plasticizer levels of about 20 percent to about 60 percent can have melt-point values in the range of about 90 degrees Celsius to about 165 degrees Celsius. Flexible PVC may thus be used to manufacture paper and plastic composite board or other products more quickly and using less energy than composite products manufactured using PVC-U. Plasticizers used in flexible PVC may include dioctylphthalate, benzylbutylphthalate, dibutylphthalate, diisononylphthalate, and diisodecylphthalate. Flexible PVC is commonly used in flexible packaging, flexible hose, decorative flooring, electric cable insulation, and inflatable products. Flexible PVC may also be used as a water-resistant membrane in the upper layer of commercial roofs, including low-slope roofs. Bulk amounts of this material are often targeted for disposal when commercial roofs are replaced, about 20-30 years after installation.

A third type of PVC is PVC-C, which is made by reacting chlorine with PVC-U. During this process, a percentage of the hydrogen atoms that are normally present in PVC-U are replaced with chlorine atoms. This substitution results in a type of PVC that is more flexible than that of PVC-U. The melt-point of PVC-C is about 150 degrees Celsius, within the preferred range of temperatures for manufacturing paper and plastic composite boards or other products.

The hot platens or belts used to melt the plastic to form a composite board or other product may heat the board materials to as high as 200 degrees Celsius for as long as 10 minutes. Maintaining PVC at these temperatures may result in some elimination and emission of hydrogen chloride. At sustained high temperatures, hydrogen and chlorine atoms are separated from some of the PVC monomers, forming an unsaturated PVC monomer and a molecule of hydrogen chloride, for example, according to the formula:

Under expected processing conditions, x will be much smaller than y. Thus, hydrogen chloride will not be eliminated from most of the vinyl chloride monomers. Nevertheless, a sufficient percentage of the monomers are expected to eliminate hydrogen chloride to pose a risk to both the processing equipment and also the working personnel in the area.

Hydrogen chloride is toxic to humans and corrosive to metal. For example, the Occupational Safety and Health Administration limits personal exposure to hydrogen chloride in the workplace to 7 milligrams per cubic meter, with no associated minimum time period. When water, including water vapor, is present with the hydrogen chloride, the hydrogen chloride acts as an acid, specifically hydrochloric acid. Hydrochloric acid is hazardous to humans and causes corrosion to many metals. Thus, while PVC could be used in the manufacture of paper and plastic composite boards and other products, the emission of hydrogen chloride makes PVC a less attractive polymer candidate. Accordingly, a process that allows for the use of PCV in the manufacture of paper and plastic composite boards and other products and minimized hydrogen chloride emissions would be desirable.

According to some embodiments, a composite board or other product may be manufactured by mixing paper, flexible PVC, and an alkaline sequestering agent to form a composite mat, heating the composite mat to melt the flexible PVC, and cooling the composite mat to congeal the melted PVC. The sequestering agent may react with the emitted hydrogen chloride to form a salt. Consumption of the hydrogen chloride as it is being formed reduces equipment corrosion and human exposure to the hydrogen chloride. In some embodiments, a tackifying agent is used to ensure that the sequestering agent, which can be a powder, remains uniformly distributed throughout the mat.

According to some embodiments, a composite board or other product may be manufactured by mixing paper, and flexible PVC (without an alkaline sequestering agent) to form a composite mat, heating the composite mat to melt the flexible PVC, and cooling the composite mat to congeal the melted PVC. Rather than including alkaline sequestering agents, in some embodiments, a ventilation system may be used to remove hydrogen chloride gas from the area of the mat as the is heated. The ventilation system may include elements such activated carbon filtration, regenerative thermal oxidizers (RTO), or other means of capturing or rendering harmless hydrogen chloride gas. Dioxin is not generally expected to form when using PVC in the production of paper fragment-based composites, but in the event that it is formed, the ventilation system can also capture and remove the dioxin by use of activated carbon filtration, RTOs, or some other means. In some embodiments, active air monitoring (e.g., sensors) and associated alarms or alerts may be used to alert operators of elevated levels of hydrogen chloride and dioxin. In some embodiments, the manufacturing system may be substantially automated, and electronic lockouts may limit human access to rooms or areas where hydrogen chloride may be present. Where humans are present, personal protective equipment, including full face respirators with organics filtration, protective clothing such as acid resistant coveralls, and skin protection (e.g., acid resistant gloves, boots, and head coverings), may be used to protect operators from hydrogen chloride and dioxin.

In embodiments in which alkaline sequestering agents are not included in the mat, the manufacturing equipment may be made of acid-resistant and corrosion-resistant materials or may be coated or plated with acid-resistant and corrosion-resistant coatings. For example, the equipment may be coated with polytetrafluoroethylene (PTFE) or plated with gold, platinum, or nickel. In some embodiments, the equipment may be made from or plated with certain alloys of stainless steel designed to resist hydrogen chloride corrosion. Any portion of the equipment that may come in contact with the hydrogen chloride, including the structure of the building housing the equipment and ventilation system components may be made from or coated in hydrogen chloride-resistant material.

Referring now to FIG. 1, an example composite board 100 is shown, in accordance with some embodiments of the present disclosure. Composite board 100 may be manufactured to operate as a roof cover board that can provide impact protection (from hail, foot traffic, and/or heavy equipment), temporary water resistance, fire resistance, wind-uplift constraint, thermal dimensional stability, and/or flexibility that is often required in roofing applications. Composite board 100 may be manufactured such that mechanical fasteners can be used to couple composite board 100 to other components (e.g., a wood frame) and/or such that adhesives can be used to adhere other components to the outer surfaces of composite board 100.

The composite board 100 may comprise three discrete layers, a top surface layer 102, a bottom surface layer 104, and a core layer 106. The top surface layer 102 and bottom surface layer 104 may be made from glass fiber fabrics, including nonwoven fiberglass mat. The top surface layer 102 and bottom surface layer 104 may also comprise paper, including kraft paper and synthetic polymer films or nonwovens, especially those having a melt-point greater than about 300 degrees Fahrenheit, such as nylon, polyester, and certain polyether-based films or nonwovens. In some embodiments, the top surface layer 102 and the bottom surface layer 104 may each be about 0.002-0.100 inches thick.

Core layer 106 may be about 0.100-1.500 inches thick and may comprise discrete cellulosic elements and plastic elements. In some embodiments, the cellulosic elements and plastic elements may be connected through the use of a thermoplastic bonding resin, such as polyethylene. The cellulosic and plastic elements may be in the form of small pieces called fragments. The plastic elements may include a mixture of thermoset plastics, which do not melt, and thermoplastics. Thermoplastic elements (e.g., fragments) can include polyethylene, polypropylene, copolymers of ethylene and propylene, polystyrene, acrylonitrile, styrene butadiene resins, and PVC, including flexible PVC and PVC-C. The size and shape of the plastic elements can vary substantially. Core layer 106 may be manufactured by heating and cooling a mat of discrete paper fragments and plastic fragments while applying pressure to the mat. The heat may melt the thermoplastic fragments, which then resolidify upon cooling.

Plastic fragments may be comprised of polypropylene, polystyrene, polyester, nylon, rubber (natural and synthetic), PVC (including flexible PVC and PVC-C), polyethylene (including LLDPE, LDPE, MDPE, HDPE), copolymers of ethylene and propylene, thermoplastic olefin (TPO), and other commercial plastics. Polyethylene based plastics, especially low and medium density polyethylene resins, may be used. The plastic fragments may be a mixture of different types of polymers. In addition to polymers, the core layer 106 can also contain plasticizers, such as dioctyl phthalate or benzyl butyl phthalate, colorants, stabilizers, preservatives, and other functional additives. Plastic fragments may be produced by disintegration (e.g., processing, shredding, milling, granulating, flaking, etc.) larger pieces of plastic. The plastic may be recycled or sourced from waste streams (films, packaging, or a wide array of plastic articles). Generating plastic fragments from waste or recycling streams has the advantage of being low cost and helps to sustainably reduce waste, which is a worldwide problem.

The core layer 106 may also include cellulosic elements. Cellulosic elements can include wood, cotton, grass (including bamboo), pulp fibers derived from various plants, rayon fibers, cellulose esters and other derivatives, paper, and other cellulose-based materials. Cellulosic elements may include paper fragments. Paper fragments may be made by milling larger pieces of paper until the disintegrated material passes through a screen with a particular mesh size. Paper subjected to the disintegration process may be newspaper, advertising, office paper, packaging, or other paper products. The paper may be recycled or sourced from waste streams. Generating paper fragments from waste or recycling streams has the advantage of being low cost and helps to sustainably reduce waste, which is a worldwide problem. In some embodiments individual fragments could contain both paper and plastic. For example, many packaging materials found in waste streams are comprised of a plurality of alternating paper and plastic layers. In some cases, these packaging materials may also include a layer of aluminum foil or a film that has been metalized on one surface. Fragments derived from all of these materials may be suitable for embodiments of this disclosure.

In some embodiments, the core layer 106 may include a salt of chlorine and an alkaline sequestering agent. For example, when the plastic fragments in the core layer 106 comprise PVC, an alkaline sequestering agent may be included to form the core layer 106. The alkaline sequestering agent may react with hydrogen chloride emitted from the PVC to form a salt of chlorine and the alkaline sequestering agent. The salt may remain in the core layer 106 after the composite board 100 cools and the plastic in the core layer congeals. The composite board 100 may thus include a composite core layer of material including cellulosic fragments, a salt of chlorine and an alkaline sequestering agent, and melted and resolidified PVC binding the cellulosic fragments and the salt together. Other products may be made with similar layers of material using similar method, for example, by heating and compressing the components used to form the layer in molds of various shapes. In some embodiments, the core layer 106 may not include a salt of chlorine and an alkaline sequestering agent. For example, when other methods are used to remove hydrogen chloride or a mixture of hydrogen chloride and dioxin from the manufacturing system, an alkaline sequestering agent may not be mixed into the mat that is heated and formed into the core layer 106.

In some embodiments, composite board 100 may include a layer of thermoplastic adhesive between the core layer 106 and each surface layer 102, 104. The thermoplastic adhesive may bond the surface layers 102, 104 to the core when the board is heated and cooled. In some embodiments, the core layer 106 may include multiple layers of discrete paper fragments and plastic fragments.

The structure of composite board 100 may be designed to achieve compression load support, sudden impact resistance, wind uplift resistance, fastener retention, adhesive compatibility, temporary rain protection, low flame spread, thermal dimensional stability, and an exceptional level of mechanical flexibility. The design promotes rapid and easy installation of the cover board in a commercial low slope roof application. It may be especially advantageous in re-roofing applications due to its level of flexibility, which may allow it to more easily conform to the curved contour of the perimeter region of the roof. The upper (when installed) outer surface of the board may allow for the absorption of adhesives but may temporarily resist transfer of rainwater into the core layer of the board. It should be understood that while the examples described herein relate to the manufacture of composite boards, other goods may be manufactured using similar processes. These products may include drywall, wallboard, construction sheeting, exterior or interior sheathing, paper, cardboard, signage, boxes, shipping containers, etc.

Figure 2:
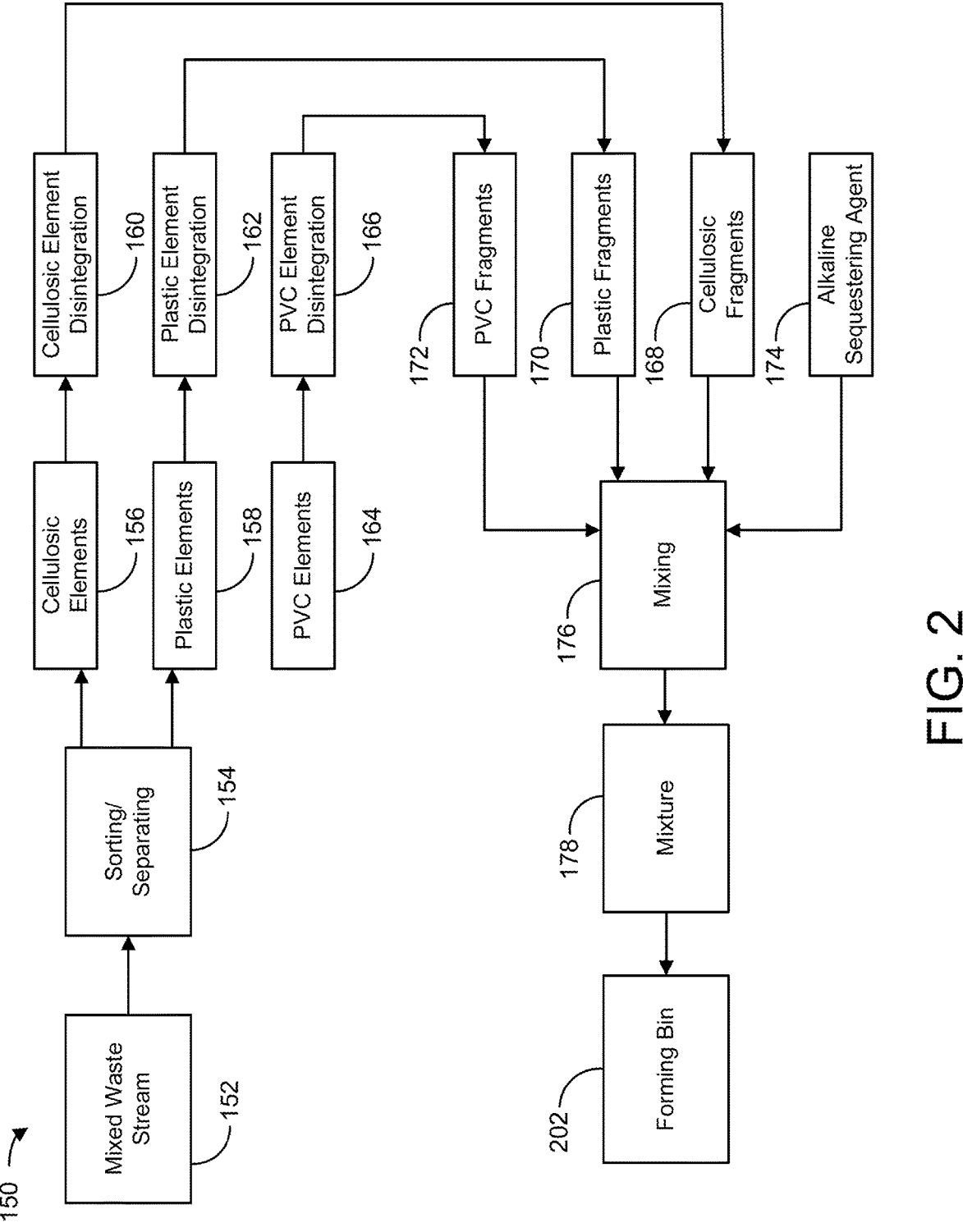
FIG. 2 is a flow diagram of an example process for preparing materials for use in forming a composite mat, in accordance with some embodiments of the present disclosure.

Referring now to FIG. 2, a schematic diagram depicting a portion of composite board manufacturing system 150 for preparing materials for use in forming a composite mat is shown, according to some embodiments. A waste stream 152 including cellulosic and/or plastic materials is sorted and separated into a set of cellulosic elements 156 and plastic elements 158 by a sorting and separating assembly 154. The waste stream 152 may be a mixed municipal waste stream, an industrial waste stream, or any other collection of materials including cellulosic and/or plastic materials. The sorting and separating assembly 154 may be or may include a magnet for removing ferromagnetic materials, a preliminary shredding/disintegration assembly, and air classifier for sorting the waste stream 152. The sorting and separating assembly 154 may remove cellulosic elements 156 and plastic elements 158 from the waste stream 152. In some embodiments, the cellulosic elements 156 and plastic elements 158 may also be separated from each other. In other embodiments, the cellulosic elements 156 and plastic elements 158 may be separated from other materials, such as metal and glass, but may remain mixed together. The cellulosic elements 156 may include wood, cotton, grass (including bamboo), pulp fibers derived from various plants, rayon fibers, cellulose esters and other derivatives, paper, and other cellulose-based materials. The size and shape of the cellulosic elements 156 can vary substantially.

The plastic elements 158 may include PVC, including flexible PVC and PVC-C, as well as thermoplastic elements other than PVC. The thermoplastic elements may be comprised of the same specific material or of a variety of thermoplastic materials with different melt points. The plastic elements 158 may include polyethylene (including LLDPE, LDPE, MDPE, HDPE), polypropylene, copolymers of ethylene and propylene, polystyrene, acrylonitrile, polyester, nylon, rubber (natural and synthetic), TPO, and styrene butadiene resins. The size and shape of the plastic elements 158 can vary substantially. The plastic elements 158 may also include mixtures of thermoset plastics, which generally do not melt, as well as thermoplastic materials with melting temperatures that exceed the processing temperatures used to form the composite boards or other products. In some embodiments, the cellulosic elements 156 and/or plastic elements 158 may be presorted. For example, the waste stream 152 may include a collection of cellulosic elements 156 and/or a collection of plastic elements 158 or a mixed collection of cellulosic elements 156 and plastic elements 158.

After the sorting and separating operations, the cellulosic elements 156 and plastic elements 158 may be disintegrated in disintegration assemblies 160, 162 to form cellulosic fragments 168, such as paper fragments, and plastic fragments 170. The cellulosic disintegration assembly 160 may be or may include a shredder, granulator, mill, flaker, grinders, or other machine and may be configured to mill cellulosic elements 156 (e.g., large pieces of paper) until the disintegrated material passes through a screen with a particular mesh size. Paper subjected to the milling process can be newspaper, advertising paper, office paper, packaging, or other paper products. In some embodiments, the cellulosic elements 156 that are disintegrated into cellulosic fragments 168 may be new material. In other embodiments, the cellulosic elements 156 may be recycled or sourced from waste streams (e.g., waste stream 152). Generating cellulosic fragments 168, including paper fragments, from waste or recycling streams may be low-cost and improves sustainability by recovering and reusing material that may otherwise be incinerated or sent to a landfill. In some embodiments, the cellulosic fragments 168 may have a thickness and diameter of less than about 0.02 inches.

The plastic disintegration assembly 162 may be or may include a shredder, granulator, mill, flaker, grinders, or other machine and may be configured to mill larger plastic elements 158 into plastic fragments 170. The plastic elements 158 may be milled until the disintegrated material passes through a screen with a particular mesh size. The plastic fragments 170 may be a mixture of different types of polymers as well as plasticizers, such as dioctyl phthalate, benzylbutylphthalate, dibutylphthalate, diisononylphthalate, and diisodecylphthalate. The plastic fragments 170 may also contain colorants, stabilizers, preservatives, and other functional additives. In some embodiments, the plastic elements 158 that are disintegrated into the plastic elements 158 may be new material. In other embodiments, the plastic elements 158 may be recycled or sourced from waste streams (e.g., waste stream 152). Generating plastic fragments 170, from waste or recycling streams may be low-cost and improves sustainability by recovering and reusing material that may otherwise be incinerated or sent to a landfill. In some embodiments, the plastic fragments 170 may have a thickness and diameter of less than about 0.02 inches.

In some embodiments, individual cellulosic and plastic elements 156, 158 and fragments 168, 170 may contain both paper and plastic. For example, many packaging materials found in waste streams (e.g., waste stream 152) are made of a plurality of alternating paper and plastic layers. In some cases, these packaging materials can also include a layer of aluminum foil or a film that has been metalized on one surface. These fragments may be included in the mat of materials heated, pressed, and cooled to form the core layer 106 of a composite board 100.

In addition to the plastic elements 158 that may be sourced from a mixed waste stream (e.g., waste stream 152) and may include PVC, a separate supply of PVC elements 164 may be provided. The PVC elements 164 may include pure PVC elements, flexible PVC elements, and PVC-C elements. The PVC elements 164 may be provided from construction waste, for example, when commercial roofs including flexible PVC are replaced. Flexible PVC elements may include plastisols based on PVC and plasticizer. The plastisols may have a PVC content of about 40 percent to about 80 percent. The plasticizers can include dioctylphthalate, benzylbutylphthalate, dibutylphthalate, diisonon-ylphthalate, and diisodecylphthalate. Flexible PVC may include PVC-C with or without plasticizer. The PVC elements 164 may be supplied to a PVC element disintegration assembly 166 in which the PVC elements 164 are milled into PVC fragments 172. The PVC element disintegration assembly 166 may be substantially similar to the plastic element disintegration assembly 162 and may be or may include a shredder, granulator, mill, flaker, grinders, or other machine and may be configured to mill the PVC elements 164 until the disintegrated material passes through a screen with a particular mesh size. The PVC elements 164 may be disintegrated into PVC fragments 172, which may be particles, powders, or larger fragments.

Any of the disintegration assemblies 160, 162, 166 may be combined. For example, the plastic elements 158 and PVC elements 164 may be mixed together and then disintegrated in a combined disintegration assembly, while the cellulosic elements 156 are disintegrated in the cellulosic disintegration assembly 160. As another example, all of the cellulosic elements 156, plastic elements 158, and PVC elements 164 may be mixed together and disintegrated in a single disintegration assembly.

After the disintegration operations, the cellulosic fragments 168, plastic fragments 170, and PVC fragments 172 (e.g., particles, powders, etc.) may be combined in a mixing assembly 176 to form a mixture 178. In some embodiments, alkaline sequestering agents 174 may also be mixed with the fragments 168, 170, 172 in the mixing assembly 176 to form the mixture 178 of PVC fragments 172 (e.g., particles, powders, etc.), cellulosic fragments 168, and at least one alkaline sequestering agent 174, and in some cases plastic fragments 170 other than PVC. The alkaline sequestering agents 174 may be substances capable of reacting with hydrogen chloride and/or hydrochloric acid to form a stable salt. The alkaline sequestering agents 174 may include calcium carbonate, calcium hydroxide, calcium oxide, sodium carbonate, sodium bicarbonate, magnesium carbonate, magnesium hydroxide, magnesium oxide, potassium carbonate, sodium salts of citric acid or tartaric acid, and other alkaline compounds that are capable of reacting with hydrogen chloride or hydrochloric acid. The alkaline sequestering agents 174 may include liquids, including non-volatile liquids, such as triethanolamine, diethanolamine, ethanolamine, isopropanolamine, or hydroxylamine. Alkaline sequestering agents 174 may also be organic solids, including solid organic amines, which may include melamine, urea, glycine, lysine, and guanidine. The alkaline sequestering agents 174 may be non-volatile and may form non-volatile salts with hydrogen chloride. The alkaline sequestering agents 174 may be weak bases rather than strong bases, such as sodium hydroxide or potassium hydroxide, as handling strong bases may be hazardous to humans. Further, strong bases may rapidly degrade paper fragments. In some embodiments, the alkaline sequestering agents 174 may be dissolved in water to form a solution before being mixed with the fragments 168, 170, 172 in the mixing assembly 176. In some embodiments, the alkaline sequestering agents 174 may be dispersed in water to form a dispersion before being mixed with the fragments 168, 170, 172 in the mixing assembly 176. In some embodiments, powdered alkaline sequestering agents 174 may be mixed with the fragments 168, 170, 172 in the mixing assembly 176. Powdered alkaline sequestering agents 174 may be easier to disperse in the fragment mixture and may support shorter hot-press time periods due to the reduced moisture content. In some embodiments, a single type of alkaline sequestering agent 174 may be added in the mixing assembly 176. In some embodiments, as discussed above, the mixture 178 may not include an alkaline sequestering agent.

In some embodiments, multiple alkaline sequestering agents 174 may be added. The different alkaline sequestering agents 174 may form different salts with hydrogen chloride. For example, the alkaline sequestering agents 174 may include a mixture of calcium carbonate and magnesium hydroxide, which respectively form the salts of calcium chloride and magnesium chloride after reacting with hydrogen chloride. The amount of alkaline sequestering agent 174 should be in excess of that required to stoichiometrically neutralize the hydrogen chloride that is emitted from the PVC fragments 172. In some embodiments, dry alkaline sequestering agents 174 can account for about 0.005 percent to about 10.0 percent of the dry mass of a composite mat before the mat is heated and pressed into a composite board or other product. The fragments 168, 170, 172 and alkaline sequestering agent 174 may be added to a mixer in a desired ratio. The mixer may be a paddle mixer, ribbon mixer, rotary mixer, or other mixing equipment. In some embodiments, the mixing assembly 176 may include a shredding machine that simultaneously processes elements 156, 158, 164, and/or fragments 168, 170, 172, and in some cases alkaline sequestering agents 174, through a shredding machine. In some embodiments, there may be multiple mixers arranged in parallel, each of which may receive a different ratio of cellulosic fragments 168, plastic fragments 170, PVC fragments 172, and alkaline sequestering agents 174. In some embodiments, the alkaline sequestering agent 174 is added to the mixture 178 by use of a spray application system. Each mixture may be used to form a separate layer of the mat that is later heated, compressed, and cooled to form the core 106 of a composite board 100.

In some embodiments, tackifying agents can be added to the mixture of cellulosic fragments, plastic fragments, PVC fragments, and sequestering agents in order to ensure that the sequestering agents, which can be powders, remain uniformly distributed on the fragments, especially during the subsequent process of mat formation and conveyance of the mat into the hot press. Tackifying agents are sticky substances and can include amino resins, such as urea-formaldehyde and melamine-formaldehyde resins, and certain acrylic resins with glass transition temperatures that are less than about 10° C., especially acrylic resins that are made with effective levels of butadiene. Other liquids with sticky compositions can also be used as tackifying agents.

In some embodiments, the various components of the mixture 178 may be mixed by the mixing assembly 176 in multiple steps. For example, the fragments 168, 170, 172 may be mixed together first, and the alkaline sequestering agents 174 may then be mixed with the mixture of fragments 168, 170, 172 to form the mixture 178. In other embodiments, the fragments 168, 170, 172 and the alkaline sequestering agents 174 may be mixed simultaneously. In some embodiments, the alkaline sequestering agent 174 may be mixed with the PVC fragments 172 (e.g., particles, powders, etc.) before being mixed with the paper and plastic fragments 168, 170. In some embodiments, the system 150 may include multiple mixing assemblies 176 configured to mix different components of the mixture 178 to form sub-mixtures, which may then be combined and mixed in a subsequent mixing assembly 176. In some embodiments, plastic fragments 170 other than PVC may not be added to the mixture 178. For example, in some embodiments, only cellulosic elements 156 and PVC elements 164 may be disintegrated into fragments 168, 172 and mixed with alkaline sequestering agent 174, while plastic elements 158 are not included. In other embodiments, a separate supply of PVC elements 164 may not be provided. For example, the plastic elements 158 from the mixed waste stream 152 may include PVC, and separate additional PVC elements 164 may not be added. Thus, the plastic fragments 170 may be considered to include PVC fragments 172, or the plastic elements 158 may be considered to be disintegrated into both plastic fragments 170 and PVC fragments 172. In some embodiments, both the PVC fragments 172 and mixed plastic fragments 170 containing PVC and other types of plastic may be included in the mixture 178. The mixture 178 may have moisture content between about 1 percent and about 20 percent, between about 2 percent and about 10 percent, or between about 3 percent and 8 percent. Higher moisture content values may require longer heating and/or venting steps during the hot-pressing process. After the fragments 168, 170, 172 and alkaline sequestering agents 174 are mixed in the mixing assembly 176, the mixture 178 may be provided to the forming bin 202. In other embodiments, the mixture 178 may be provided to a manufacturing system for other products.

Figure 3:
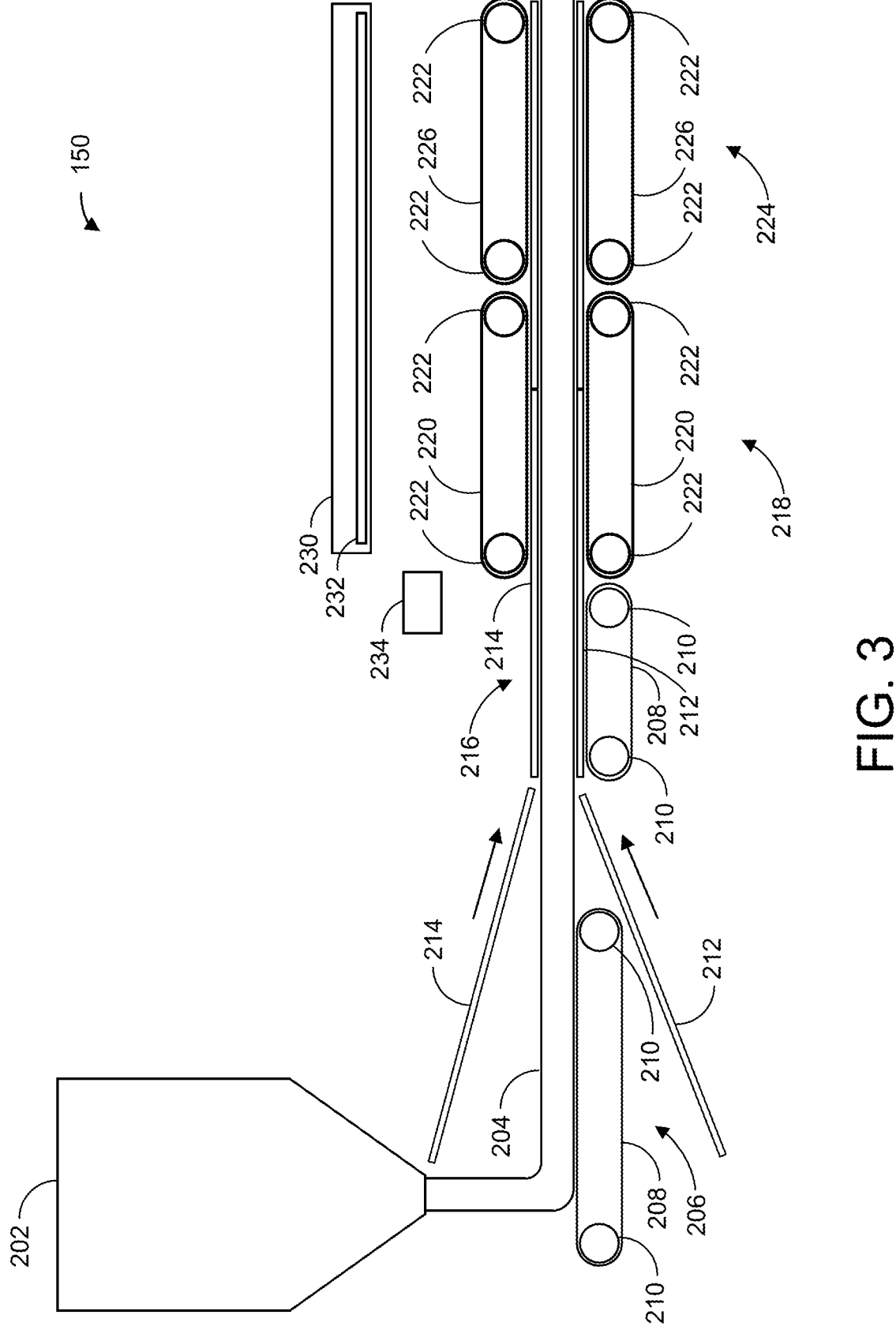
FIG. 3 is a side view illustration of a portion of a composite board manufacturing system, in accordance with some embodiments of the present disclosure.

Referring now to FIG. 3, another portion of the composite board manufacturing system 150 is shown in further detail, in accordance with some embodiments of the present disclosure. It should be understood that the various components of the composite board manufacturing system 150 shown in FIG. 3 are not to scale. Further, certain components in the system, including cutting components, are not shown. As discussed above, the composite board manufacturing system 150 may include a forming bin 202 configured to receive the mixture 178 from the mixing assembly 176 and to dispense a continuous mat 204 of plastic (e.g., PVC), cellulosic fragments, and alkaline sequestering agent 174 onto a conveyor system 206. The continuous mat 204 may be heated, pressed, and cut to form the core layer 106 of the composite board 100. The conveyor system 206, may include one or more belts 208 arranged end to end, each belt 208 travelling around two or more rollers 210. One or more of the rollers 210 may be driven, for example, by a motor or engine. The conveyor system 206 may move the continuous mat 204 through the various stages of manufacturing of the composite board 100. As used herein, the term "downstream" refers to the direction that the conveyor system 206 moves the continuous mat 204, and the term "upstream" refers to a direction opposite the direction that the conveyor system 206 moves the continuous mat 204. The moisture in the continuous mat prior to hot-pressing may be uniformly distributed throughout the mat, or alternatively, it may be non-uniformly distributed. For example, the moisture content may be higher near the top and bottom outer surfaces of the continuous mat 204 if the mat is created in discrete layers, wherein the material used to form the top and bottom outer surface layers has a moisture content that is greater than that of the material that is used to form the inner layer of the mat. In some embodiments, the system 150 may include multiple forming bins 202 for forming different layers of the continuous mat 204. As discussed above, different mixtures 178 with fragments 168, 170, 172 and alkaline sequestering agents 174 in different ratios may be supplied to the forming bins 202. In some embodiments, a first mixture may be supplied to two forming bins used to form outer layers of the continuous mat 204 and a second mixture may be supplied to a third forming bin 202 to form an inner layer of the continuous mat 204. Additional forming bins 202 may be included to form additional layers. Each forming bin 202 may receive and dispense a different mixture, or, in some cases, some of the forming bins 202 may receive and dispense the same mixture.

Lower facers 212 may be inserted from underneath the conveyor system 206 such that the lower facers 212 are positioned between the continuous mat 204 and the conveyor belt 208. In some embodiments, the lower facers 212 may be positioned on the conveyor system 206 upstream of the forming bin 202, such that the continuous mat 204 is deposited directly onto the lower facers 212. Upper facers 214 may be positioned on top of the continuous mat 204 to form a composite sandwich 216 including the continuous mat 204 sandwiched between the lower facers 212 and the upper facers 214. Thus, when the continuous mat 204 is pressed, cooled, and cut, a lower facer 212, or a portion of a lower facer 212, may form the bottom surface layer 104 of the composite board 100. The upper facer 214, or a portion of the upper facer 214, may form the top surface layer 102 of the composite board. In some embodiments, only the upper facers 214 or only the lower facers 212 may be added, such that the finished composite board 100 does not include either a top surface layer 102 or a bottom surface layer 104. In some embodiments, the mat of paper and plastic that is pressed to form the core layer 106 may not be continuous. For example, the core layer 106 material may be deposited on to the conveyor belt 208 with periodic interruptions if needed for manufacturability. The upper and lower facers 212, 214 may be made from paper, woven cellulosic fabrics, hydroentangled cellulosic nonwoven fabrics, nylon film, polyester film, nylon nonwoven fabrics, polyester nonwoven fabrics, nylon woven fabrics, polyester woven fabrics, glass fiber nonwoven fabrics, glass woven roving, metallic foils, and other thin sheet or roll goods. The upper and lower facers 212, 214 may have a melt point above 350 degrees Fahrenheit or above 450 degrees Fahrenheit, or may not have a recognized melt point. The facers 212, 214 may be made of intractable materials, where "intractable materials" means polymeric materials that are insoluble in water and have a melt-point greater than about 350 degrees Fahrenheit. The facers 212, 214 may each have a thickness between about 0.00001 inches and 0.20 inches in some embodiments, the thickness of the facers 212, 214 may exceed 0.20 inches.

After the lower facers 212 and/or the upper facers 214 are positioned respectively underneath and on top of the continuous mat 204, the conveyor system 206 may move the composite sandwich 216 to a hot press assembly 218. The hot press assembly 218 may include heated belts 220, each travelling around two or more rollers 222 in a continuous circuit, positioned above and below the composite sandwich 216. One or more of the rollers 222 may be driven, for example, by a motor or engine. In some embodiments, the heated belts 220 may be made of steel. The heated belt 220 may be heated to a temperature in the range of about 350 degrees Fahrenheit to about 480 degrees Fahrenheit. A heating element (e.g., a resistive heating element, an inductive heating element, etc.) may be placed in contact with or in proximity to the heated belt 220 to heat the heated belt 220 to the desired temperature. For example, a resistive heating element may be positioned between the upper and lower segments of each heated belt 220 or adjacent the segment of the heated belt 220 not in contact with the composite sandwich 216. In some embodiments, one or more of the rollers 222 may include heating elements, and heat may be transferred from the rollers 222 to the heated belts 220. In some embodiments, hot platens can be positioned on the outside surfaces of the steel belt and can be used to heat the steel belt. These platens can also apply pressure to the mat through the steel belt. In some embodiments, small rolling pins are positioned between the platens and the steel belt to reduce the force required to slide the steel belt past the platens. The platens can be heated by circulating hot oil through conduits within the platens. The oil can be heated in a combustion system that utilizes natural gas or other fuels. The system 150 may include temperature sensors to measure the temperatures of the heated belts 220. Sensors can also be used to measure the temperature of the hot platens or other heating devices that might be used to heat the steel belt. The measurements can be used to control the heating elements or hot oil fluid flow to maintain the heated belts 220 at the desired temperature. The heated belts 220 and rollers 222 may function similarly to the conveyor system 206, with the rollers 222 being configured to drive the heated belts 220 to move the composite sandwich 216 continuously through the hot press assembly 218. At the same time, the heated belts 220 and platens apply heat and high pressure to melt the plastic in the continuous mat 204 and compress the composite sandwich 216. In some embodiments, there may be only one heated belt 220 either above or below the composite sandwich 216, with the other side of the composite sandwich 216 not being heated. In these embodiments, a non-heated belt (e.g., similar to conveyor belt 208) may be used to apply pressure, but not heat, to the opposite side of the composite sandwich 216. The speed and length of the heated belts 220 may determine the amount of time that the heated belts 220 apply heat and pressure to the composite sandwich 216. The amount of time that the heat and pressure is applied may be sufficient to melt the PVC fragments 272, as well as any other plastic fragments 268.

As discussed above, heating the composite sandwich 216 may cause the PVC fragments in the continuous mat 204 to emit hydrogen chloride. The alkaline sequestering agents 174 may react with the hydrogen chloride to form chloride salts. The continuous mat 204 may contain sufficient alkaline sequestering agents 174 to react with all, substantially all, or most of the emitted hydrogen chloride. For example, if calcium carbonate is used as the alkaline sequestering agent 174, the reaction with the hydrogen chloride may be as follows:

$$CaCO_3 + 2HCl \rightarrow CaCl_2 + CO_2 + H_2O$$

For each mole of calcium carbonate, two moles of hydrogen chloride may be sequestered as calcium chloride. Accounting for the molecular weight values of the calcium carbonate (99.947 g/mole) and the hydrogen chloride (35.977 g/mole), the maximum amount of hydrogen chloride that can be sequestered may be about 72% of the weight of the calcium carbonate weight. However, in practice, it may be preferable for the calcium carbonate level to be at least 5-10 times the stoichiometric level that is required. The excess calcium carbonate may provide a safety factor and can also minimize some of the hygroscopic and corrosive effects of the calcium chloride in the final product. Likewise, other alkaline sequestering agents may be used at a level that is significantly greater than the stoichiometric level. In another embodiment, sodium bicarbonate can be used as an alkaline sequestering agent, which may avoid the formation of calcium chloride. Thus, selection of the alkaline sequestering agent can be based on multiple considerations, including cost, availability, impact of the salt that is formed on the final product, and other aspects of the manufacturing process and product application.

In some embodiments, the system 150 may include a ventilation system 230 with an intake 232 that may be positioned near the hot press assembly 218. Gases such as hydrogen chloride and dioxin produced when the PVC fragments are heated in the hot press assembly may be drawn into the intake 232 and carried away from the system 150 by the ventilation system 230. In some embodiments, the system 150 may include one or more sensors 234. In some embodiments, one or more of the sensors 234 may be configured to detect hydrogen chloride. The hydrogen chloride sensors 234 may be coupled to a controller (e.g., controller 304, discussed below) configured to trigger an alarm when the detected level of hydrogen chloride exceeds a predetermined amount. In some embodiments, one or more of the sensors 234 may be configured to detect that the system 150 or the press system (e.g., hot press 218, cold press 224) is active and producing boards. Again, the sensors 234 may be coupled to a controller. The controller may be configured to lock a door or otherwise prevent access by humans to the system 150 when the controller 234 detects that the system 150 is active. In some embodiments, the controller may be configured to activate the system and may be configured to lock the door or otherwise prevent access by humans to the system 150 when the system 150 is activated (e.g., without the need for a sensor 234).

As the composite sandwich 216 exits the hot press assembly 218, the heated belts 220 may move the composite sandwich 216 to a cold press assembly 224. In some embodiments, an additional section of the conveyor system 206 may move the composite sandwich 216 from the hot press assembly 218 to the cold press assembly 224. The cold press assembly 224 may include cold belts 226, each travelling around two or more rollers 222 in a continuous circuit, positioned above and below the composite sandwich 216. One or more of the rollers 222 may be driven, for example, by a motor or engine. In some embodiments, the cold belts 226 may be made of steel. In some embodiments, "cold belts" may refer to belts that are colder than the heated composite sandwich 216. In some embodiments, cold platens can be positioned on the outside surfaces of the steel belt and can be used to cool the steel belt. These platens can also apply pressure to the mat through the steel belt. In some embodiments, small rolling pins are positioned between the platens and the steel belt to reduce the force required to slide the steel belt past the platens. The platens can be cooled by circulating cold fluid through conduits within the platens. The cold fluid can be generated by use of a chiller or refrigeration unit. The cold fluid may be colder than a temperature of the heated composite sandwich 216. The system 150 may include temperature sensors to measure the temperatures of the cold belts 226. The measurements can be used to control a refrigeration system to maintain the cold belts 226 at a desired temperature. The cold belts 226 and rollers 222 may function similarly to the conveyor system 206, with the rollers 222 being configured to drive the cold belts 226 to move the composite sandwich 216 continuously through the cold press assembly 224. At the same time, the cold belts 226 and platens apply high pressure to resolidify (e.g., freeze, congeal, etc.) the plastic in the continuous mat 204 and compress the composite sandwich 216. In some embodiments, there may be only one cold belt 226 either above or below the composite sandwich 216, with the other side of the composite sandwich 216 not being cooled. In these embodiments, a non-cooled belt (e.g., similar to conveyor belt 208) may be used to apply pressure, but not remove heat, from the opposite side of the composite sandwich 216.

As discussed above, a stationary hot press comprising hot platens may replace the hot press assembly 218, and a stationary cold press with cold platens may replace the cold press assembly 224. For example, the forming bin 202 may deposit portions of the mixture 178 into a forming box to form a mat, similar to the continuous mat 204 described above. The mat may be moved in sequence to the stationary hot press, in which the hot platens compress the mat and melts the plastic, and then to the cold press, in which the cold platens compress the mat and congeal the plastic. Like the continuous mat 204, the mat formed in the forming box may be positioned between facer layers or may have a facer layer on either side thereof. The stationary hot press may be a single-opening press or a multi-opening press and may apply heat and pressure for an amount of time sufficient to melt the PVC fragments 272, as well as any other plastic fragments 268 in the mat. Like the heated belts 220 of the hot press assembly 218, the stationary hot press may cause the PVC fragments 272 to emit hydrogen chloride, all, substantially all, or most of which may be neutralized by the alkaline sequestering agent 174 to form salts in embodiments including the alkaline sequestering agent 174. Cold platens of a cold press may apply pressure to the mat for an amount of time sufficient to congeal the melted plastic fragments, including PVC fragments. The hydrogen chloride emission from the PVC may begin while the mat is in the hot press and could persist for some period of time after the mat has been transferred to the cold press. As discussed above, the components of the system 150 may be made from, coated with, or plated with corrosion-resistant materials. For example, the belts 220, 226 and rollers 222 of the hot and cold presses 218, 224, the hot platens of stationary presses, the ventilation system 230, the forming bin 202, etc. may be made from stainless steel, coated in PTFE, or plated in gold, platinum, or nickel.

Figure 4:
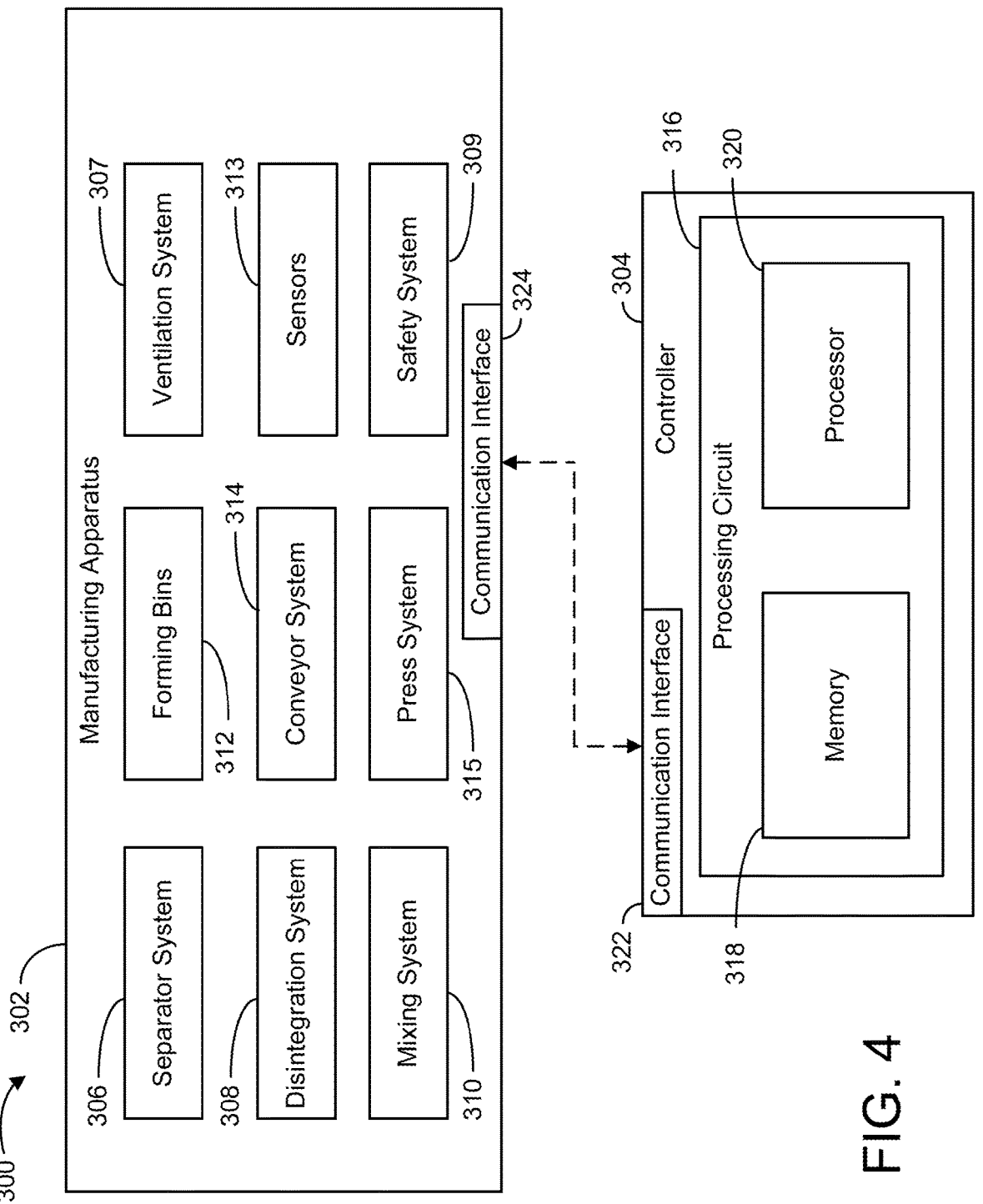
FIG. 4 is a block diagram of a composite board manufacturing system, in accordance with some embodiments of the present disclosure

Referring now to FIG. 4, a block diagram of a composite board manufacturing system 300 is shown, in accordance with some embodiments of the present disclosure. The composite board manufacturing system 300 may be similar or equivalent to the composite board manufacturing system 150, shown and described with reference to FIGS. 2 and 3. Composite board manufacturing system 300 may include a manufacturing apparatus 302 and a controller 304. Controller 304 may be a component of manufacturing apparatus 302 (e.g., a processor and/or display coupled to manufacturing apparatus 302) or may be external to manufacturing apparatus 302. Manufacturing apparatus 302 may include a separator system 306 (e.g., similar or equivalent to the sorting and separating assembly 154), a ventilation system 307 (e.g., similar or equivalent to the ventilation system 230) a disintegration system 308 (e.g., similar or equivalent to the disintegration assemblies 160, 162, 166), a safety system 309, a mixing system 310 (e.g., similar or equivalent to the mixing assembly 176), forming bins 312 (e.g., similar or equivalent to the forming bins 202), sensors 313 (e.g., sensor 234), a conveyor system 314 (e.g., similar or equivalent to the conveyor system 206), and a press system 315 (e.g., including presses similar to the hot press assembly 218 and the cold press assembly 224). Controller 304 may be configured to operate manufacturing apparatus 302 to manufacture composite boards 100. In some instances, controller 304 may receive sensor data from sensors 313 that indicate one or more characteristics of a composite sandwich 216 and/or the manufacturing apparatus 302 and may adjust the operation of manufacturing apparatus 302 based on the sensor data (e.g., adjust a speed of a conveyor belt of conveyor system 314, a temperature of the belts of a hot or cold press assembly in the press system 315, etc.). For example, measurements from a temperature sensor configured to measure the temperature of a heated belt (e.g., heated belt 220) may be used to adjust the temperature of the belt. Measurements from a moisture sensor configured to measure the moisture content of a pressed composite sandwich 216 may be used to adjust the speed of the conveyor system 314 and the heated belts 220.

Controller 304 may include a processing circuit 316 and a communication interface 322. Processing circuit 316 may include a memory 318 and a processor 320, in some embodiments. Processing circuit 316 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. Processor 320 may include an ASIC, one or more FPGAs, a DSP, circuits containing one or more processing components, circuitry for supporting a microprocessor, a group of processing components, or other suitable electronic processing components. In some embodiments, processor 320 may execute computer code stored in memory 318 to facilitate the activities described herein. Memory 318 may be any volatile or non-volatile computer-readable storage medium capable of storing data or computer code relating to the activities. According to some embodiments, memory 318 may include computer code modules (e.g., executable code, object code, source code, script code, machine code, etc.) for execution by processor 320.

Communication interface 322 may communicate with a communication interface 324 of manufacturing apparatus 302 via any synchronous or asynchronous network. Communication interface 322 may include one or more communication interfaces that can communicate with the components of manufacturing apparatus 302. For example, controller 304 may receive data from sensors 313 and may control separator system 306, disintegration system 308, mixing system 310, forming bin 312, conveyor system 314, and/or press system 315 via communication interface 322.

For example, controller 304 may send instructions via communication interface 322 to the communication interface 324 of the manufacturing apparatus 302. The instructions may cause the separator system 306 to separate plastic elements 158 and cellulosic elements 156 from a mixed waste stream 152, and to separate the plastic elements 158 and cellulosic elements 156 from each other. The controller 304 may send instructions to the disintegration system 308 to disintegrate the cellulosic elements 156 and plastic elements 158, in addition to PVC elements 164. The instructions may include a target average fragment size for each set of elements 156, 158, 164. In response to receiving the instructions, the shredders, mills, etc. of the disintegration system 308 may be adjusted to achieve the requested target average fragment size, for example, by using a screen with a different mesh size or increasing or decreasing the duration of milling. The controller 304 may send instructions (e.g., commands, signals, etc.) to the mixing system 310 indicating the ratio of fragments 168, 170, 172 and alkaline sequestering agents 174 in the mixture. In response to receiving the instructions, actuators in the mixing system 310 may control how much of each type of fragment 168, 170, 172 and how much of each type of alkaline sequestering agent 174 are added to the mixture 178 or mixtures 178. For example, the mixing system 310 may include storage tanks for the fragments 168, 170, 172 and alkaline sequestering agents 174, and the instruction may cause a valve of each storage tank to open for a predetermined period of time to dispense the components of the mixture 178 in the desired ratio. The sensors 313 may include a hydrogen chloride sensor. If the sensor data from the hydrogen chloride sensor exceeds a predetermined amount, the controller 304 may send instructions to the mixing system 310 to increase the amount of alkaline sequestering agents 174 added to the mixture 178. The sensors 313 may include a weight sensor configured to measure the weights of the components of the mixture 178 to ensure the correct ratio of components is added to a mixer of the mixing system 310. As discussed above, the manufacturing apparatus 302 may include a safety system 309, which may include alarms and/or actuated lockout systems. In some embodiments, when a sensor 313 detects a hydrogen chloride concentration that exceeds a predetermined level, the controller 304 may cause the alarms of the safety system 309 to sound in order to warn operators of the elevated hydrogen chloride levels. In some embodiments, when a sensor 313 detects that the manufacturing apparatus 302 is operating, the controller 304 may control a lockout actuator of the safety system to prevent access by humans to the manufacturing apparatus.

Based on sensor data and via communication interface 322, controller 304 may transmit signals to the manufacturing apparatus 302 or devices (e.g., actuators or controllers) that operate the individual components 312-315 to cause manufacturing apparatus 302 to form a composite sandwich 216 and move the composite sandwich 216 on conveyor system 314 (e.g., by moving a conveyor belt of conveyor system 314) through the presses of press system 315. For example, the controller 304 may send instructions to the forming bins 312 indicating the amount of each mixture 178 to be deposited by each forming bin 312 or a desired thickness of each mixture 178 in the continuous mat 204. In response to receiving the instructions, actuators of the forming bins 312 may cause the mixtures 178 to be dispersed at a rate corresponding to the amounts instructed by the controller 304. The controller 304 may also send instructions to the conveyor system 314 and the press system 315 to control the speed of the continuous press assemblies 218, 224 and conveyor belts 208. In response to receiving the instructions, motors in conveyor system 314 and press system 315 may control the speed of the rollers 210, 222 that drive the belts 210, 220. The controller 304 may correlate the amount of the mixtures 178 dispensed from the forming bins 312 to the speed of the belts 210, 220. If the system includes a stationary press, the controller 304 may be configured to control a hydraulic or other linear actuator to raise and lower an upper portion of the hot press to compress a composite sandwich 216. The controller 304 may also be configured to control a set of saws, including longitudinal rip saws and cross-cut saws, and one or more actuators of a cutting assembly to cut the composite sandwich 216 into finished composite boards 100.

FIG. 5 is a diagram of an example process 400 for forming a composite board 100, in accordance with some embodiments of the present disclosure. Process 400 can be performed using a composite board manufacturing system (e.g., composite board manufacturing system 150), which may include a controller (e.g., controller 304), milling and shredding devices, measuring devices, and mixing devices, as described with reference to FIG. 2. Process 400 may include more or fewer operations, and the operations may be performed in any order. Performance of process 400 may enable the composite board manufacturing system to manufacture, from waste materials, a composite board 100.

At operation 402 of the process 400, mixed material is received by the system. The mixed material may include new material or may be a waste stream (e.g., a municipal waste stream, the waste stream 152, etc.). The mixed material may include cellulosic elements and plastic elements. In some embodiments, the mixed material may contain cellulosic elements but not plastic elements. In some embodiments, the plastic elements may include PVC, including pure PVC, flexible PVC, and PVC-C. At operation 404 of the process 400, PVC elements are received by the system. The PVC elements may include pure PVC, flexible PVC, and PVC-C elements. In some embodiments, the system may not receive a separate supply of PVC elements, and PVC elements may be included in the plastic elements of the mixed material received in operation 402. In some embodiments, PVC elements may be included in both the mixed material received in operation 402 and in the separate supply of PVC elements received in operation 404. In some embodiments, the plastic elements received in operation 402 may not include PVC. At operation 406 of the process 400, cellulosic and plastic elements may be separated from the mixed material. In some embodiments, the cellulosic elements and plastic elements may be separated from each other. In other embodiments, the cellulosic elements and plastic elements may be separate from other waste but kept together. In some embodiments, cellulosic elements may be separated from the mixed material while plastic elements are not separated from the mixed material. Separating the cellulosic elements and plastic elements form the mixed material may include removing ferromagnetic materials using magnets, preliminary shredding/disintegration operations, and sorting the mixed materials using an air classifier.

At operation 408 of the process 400, the PVC elements, plastic elements, and cellulosic elements may be disintegrated to form PVC fragments, plastic fragments, and cellulosic fragments. As discussed above, the plastic fragments formed from plastic elements from the mixed material may also contain PVC. Shredders, granulators, mills, flakers, grinders, or other machines may be used to disintegrate the elements. In some embodiments, each of the cellulosic elements, plastic, elements, and PVC elements may be separately disintegrated. In other embodiments, some or all of the cellulosic elements, plastic elements, and PVC elements may be disintegrated together. At operation 410 of the process 400, the PVC fragments, plastic fragments, cellulosic fragments, and alkaline sequestering agents may be mixed. A paddle mixer, ribbon mixer, rotary mixer, or other mixing equipment may be used to mix the fragments and alkaline sequestering agents. In some embodiments, the mixture may include PVC fragments, cellulosic fragments, alkaline sequestering agents, and plastic fragments of materials other than PVC. In some embodiments, the mixture may include PVC fragments, cellulosic fragments, and alkaline sequestering agents, but may not include plastic fragments other than PVC. In some embodiments, PVC elements, cellulosic elements, alkaline sequestering agents, and in some cases plastic elements other than PVC may be mixed before the disintegration operation 408. Thus, all of the elements may be simultaneously disintegrated and mixed with the alkaline sequestering agent. The process 400 may include calculating or determining an amount of alkaline sequestering agents to be included in the first mixture. The amount of alkaline sequestering agents may be calculated or determined based on an amount of PVC fragments in the mixture. For example, the amount of alkaline sequestering agents may be calculated based on an amount of alkaline sequestering agents needed to stoichiometrically neutralize hydrogen chloride expected to be emitted by the PVC fragments when the mat of the mixture is heated. The amount of alkaline sequestering agents added to the mixture may exceed this stoichiometric amount. In some embodiments, a tackifying agent can be added to the mixture of alkaline sequestering agent, cellulosic fragments, PVC fragments, and other materials. In some embodiments, in operation 410, the PVC fragments, plastic fragments, cellulosic fragments may be mixed without including an alkaline sequestering agent.

At operation 412 of the process 400, a mat may be formed using the mixture. For example, a forming bin may deposit a continuous mat of the mixture onto a conveyor belt or may deposit a discrete amount of the mixture into a forming box. In some embodiments, the mat may be positioned between facer layers, on top of one facer layer, or below one facer layer. At operation 414 of the process 400, the mat may be heated and compressed. For example, a continuous press may apply heat and pressure to the mat using circulating heated belts. Alternatively, a single-opening or multi-opening stationary press may compress the mat using heated platens. In either case, the heat and pressure may be applied for an amount of time and at a temperature sufficient to melt at least a portion of the PVC fragments, and in some cases, plastic fragments other than PVC. At operation 416 of the process 400, the mat may be cooled and compressed. For example, a continuous press may cool and apply pressure to the mat using circulating cold belts (in conjunction with cold platens located outside of the cold belt). Alternatively, a single-opening or multi-opening stationary press may compress the mat using cold platens. In either case, heat may be removed from the mat and pressure may be applied to the mat for an amount of time and at a temperature sufficient to congeal (e.g., freeze) at least a portion of the melted PVC fragments and, in some cases at least a portion of the melted plastic fragments other than PVC. In some embodiments, the process 400 may include cutting the cooled mat and facer layers to form a composite board 100. While the process 400 describes the manufacture of composite boards 100, other products may be made using operations similar to the operations of process 400. For example, the mixture of cellulosic fragments, PVC fragments, and plastic fragments other than PVC may be deposited into a mold, heated, and cooled to form products of various shapes and sizes. In some embodiments, two or more mixtures of PVC fragments, cellulosic fragments, and alkaline sequestering agents may be formed with different ratios of PVC fragments to cellulosic fragments. The different ratios of materials may be determined based on mass, volume, number of fragments, etc. The different mixtures may be used to form different layers of a mat that may be heated, compressed, and cooled to form a board or other product.

In an aspect, a method of manufacturing a product is provided. The method includes forming a first mixture of PVC fragments, cellulosic fragments, and at least one alkaline sequestering agent, heating the first mixture at a temperature and duration sufficient to melt at least a portion of the PVC fragments, and cooling the first mixture until the melted PVC fragments resolidify.

In some embodiments, the PVC fragments include at least one of flexible PVC or PVC-C. In some embodiments, the cellulosic fragments include paper. In some embodiments, the first mixture further includes plastic fragments made of plastic materials other than PVC.

In some embodiments, the method further includes determining an amount of the at least one alkaline sequestering agent to be included in the first mixture, wherein the amount of the at least one alkaline sequestering agent is based on an amount of PVC fragments in the first mixture. In some embodiments, the amount of the at least one alkaline sequestering agent exceeds an amount needed to stoichiometrically neutralize hydrogen chloride expected to be emitted by the PVC fragments when the first mixture is heated. The amount of hydrogen chloride emitted from the PVC may be related to or based on the amount or percentage of PVC in the mat (e.g., the amount or percentage of PVC fragments in the first mixture), the temperature of the mat during pressing, and the time at which the mat is at elevated temperature during the pressing process. Other factors may also influence the amount of hydrogen chloride generated within the mat during pressing.

In some embodiments, a dry mass of the at least one alkaline sequestering agent includes about 0.005 percent to about 10.0 percent of a dry mass of the first mixture.

In some embodiments, the at least one alkaline sequestering agent is non-volatile and forms non-volatile salts with hydrogen chloride.

In some embodiments, the at least one alkaline sequestering agent is in the form of a powder.

In some embodiments, the first mixture includes at least one tackifying agent. The at least one tackifying agent may include at least one of an amino resin, such as urea-formaldehyde and melamine-formaldehyde, or an acrylic resin derived from monomer mixtures that include butadiene.

In some embodiments, the at least one alkaline sequestering agent includes at least one of calcium carbonate, calcium hydroxide, calcium oxide, sodium carbonate, sodium bicarbonate, magnesium carbonate, magnesium hydroxide, magnesium oxide, potassium carbonate, potassium bicarbonate, and sodium salts of citric acid or tartaric acid.

In some embodiments, the method further includes forming a mat including the first mixture, wherein heating the first mixture includes compressing the mat in a heated press.

In some embodiments, the method further includes determining an amount of the at least one alkaline sequestering agent to be included in the first mixture, wherein the amount of the at least one alkaline sequestering agent is based on an amount of PVC fragments in the first mixture, the temperature of the mat during pressing, and the time at which the mat is at elevated temperature during pressing.

In some embodiments, an average fragment size of the cellulosic fragments is less than about 0.020 inches, and wherein the PVC fragments include particles or a powder.

In some embodiments, the method further includes forming a second mixture of PVC fragments, cellulosic fragments, and at least one alkaline sequestering agent, wherein the first mixture includes a first ratio of PVC fragments to cellulosic fragments, and the second mixture includes a second ratio of PVC fragments to cellulosic fragments, the first ratio being different than the first ratio.

In some embodiments, the method further includes forming a mat including a first layer including the first mixture and a second layer including the second layer, wherein heating the first mixture further includes heating the second mixture at a temperature and duration sufficient to melt at least a portion of the PVC fragments in the second layer.

In some embodiments, a moisture content of the mixture is between about 1 percent and about 20 percent.

In another aspect, a product is provided. The product includes a first composite layer of material including cellulosic fragments, a salt of chlorine and an alkaline sequestering agent, and PVC binding the cellulosic fragments and the salt together. In some embodiments, the salt could be secured within the composite matrix by a combined effect of PVC and tackifying agent; or the PVC and other plastic fragments; or the PVC, other plastic fragments, and tacki- fying agent.

In some embodiments, the salt constitutes about 0.01 percent to about 3.0 percent of the first composite layer of material by mass.

In some embodiments, the PVC includes at least one of flexible PVC or PVC-C.

In some embodiments, the product further includes at least one of a first facer layer on a first side of the first composite layer and a second facer layer on a second side of the first composite layer opposite the first side, wherein the facer layers include at least one of paper, woven cellulosic fabrics, hydroentangled cellulosic nonwoven fabrics, nylon film, polyester film, nylon nonwoven fabrics, polyester nonwoven fabrics, nylon woven fabrics, polyester woven fabrics, glass fiber nonwoven fabrics, glass woven roving, or metallic foils.

In some embodiments, the product further includes a second composite layer of material including cellulosic fragments, a salt of chlorine and an alkaline sequestering agent, and PVC binding the cellulosic fragments and the salt together, wherein the first composite layer includes a first ratio of PVC fragments to cellulosic fragments, and the second composite layer includes a second ratio of PVC fragments to cellulosic fragments, the first ratio being dif- ferent than the first ratio.

In another aspect, a system is provided. The system includes a mixing system including a mixer, a press system including a heated press, a controller operatively coupled to the mixing system and the press system. The controller includes at least one processor and at least one memory storing instructions that, when executed by the at least one processor, cause the at least one processor to send com- mands to the mixing system, the commands causing the mixing system to supply mixture components including a first amount of cellulosic fragments, a second amount of PVC fragments, and a third amount of alkaline sequestering agent to the mixer, and further causing the mixer to mix the mixture components to form a mixture. The instructions further cause the at least one processor to send commands to the press system, the commands causing the heated press to heat and compress at least a portion of the mixture.

In some embodiments, the mixture components further include plastic fragments other than PVC.

In some embodiments, the PVC fragments include at least one of flexible PVC or PVC-C.

In some embodiments, the instructions further cause the at least one processor to calculate the third amount of alkaline sequestering agent based on the second amount of PVC fragments. In some embodiments, calculating the third amount of alkaline sequestering agent includes determining an amount of alkaline sequestering agent needed to stoi- chiometrically neutralize hydrogen chloride expected to be emitted by the PVC fragments when the first mixture is heated in the heated press.

In some embodiments, the system further includes a disintegration system including at least one of a shredder, granulator, mill, flaker, or grinder, wherein the instructions further cause the at least one processor to send a command to the disintegration system to disintegrate cellulosic ele- ments to form cellulosic fragments and to disintegrate PVC elements to form PVC fragments.

In some embodiments, the press system further includes a cold press, wherein the instructions further cause the at least one processor to send commands to the press system, the commands causing the cold press to cool and compress the at least a portion of the mixture after the heated press heats and compresses the at least a portion of the mixture.

In another aspect, a method of manufacturing a product is provided. The method includes forming a first mixture of PVC fragments and cellulosic fragments, heating the first mixture at a temperature and duration sufficient to melt at least a portion of the PVC fragments, and cooling the first mixture until the melted PVC fragments resolidify.

In some embodiments, the PVC fragments include at least one of flexible PVC or PVC-C. In some embodiments, the cellulosic fragments include paper. In some embodiments, the first mixture further includes plastic fragments made of plastic materials other than PVC.

In some embodiments, the method further includes form- ing a mat including the first mixture, wherein heating the first mixture includes compressing the mat in a heated press.

In some embodiments an average fragment size of the cellulosic fragments is less than about 0.020 inches, and wherein the PVC fragments includes particles or a powder.

In some embodiments, the method further includes form- ing a second mixture of PVC fragments and cellulosic fragments, wherein the first mixture includes a first ratio of PVC fragments to cellulosic fragments, and the second mixture includes a second ratio of PVC fragments to cellu- losic fragments, the first ratio being different than the first ratio. In some embodiments, the method further includes forming a mat including a first layer including the first mixture and a second layer including the second layer, wherein heating the first mixture further includes heating the second mixture at a temperature and duration sufficient to melt at least a portion of the PVC fragments in the second layer.

In some embodiments, a moisture content of the mixture is between about 1 percent and about 20 percent.

In some embodiments, the first mixture further includes at least one tackifying agent. In some embodiments, the at least one tackifying agent includes urea-formaldehyde, mela- mine-formaldehyde, and an acrylic resin derived from monomer mixtures that includes butadiene.

In some embodiments, the mixture does not include an alkaline sequestering agent.

In another aspect, a product is provided. The product includes a first composite layer of material including cellu- losic fragments and PVC binding the cellulosic fragments together.

In some embodiments, the PVC includes at least one of flexible PVC or PVC-C.

In some embodiments, the product further includes at least one of a first facer layer on a first side of the first composite layer and a second facer layer on a second side of the first composite layer opposite the first side, wherein the facer layers include at least one of paper, woven cellulosic fabrics, hydroentangled cellulosic nonwoven fabrics, nylon film, polyester film, nylon nonwoven fabrics, polyester nonwoven fabrics, nylon woven fabrics, polyester woven fabrics, glass fiber nonwoven fabrics, glass woven roving, or metallic foils.

In some embodiments, the product further includes a second composite layer of material including cellulosic fragments and PVC binding the cellulosic fragments together, wherein the first composite layer includes a first ratio of PVC fragments to cellulosic fragments, and the second composite layer includes a second ratio of PVC fragments to cellulosic fragments, the first ratio being different than the first ratio.

In some embodiments, the first composite layer does not include a salt of chlorine and an alkaline sequestering agent.

In another aspect, a system is provided. The system includes a mixing system including a mixer, a press system including a heated press, and a controller operatively coupled to the mixing system and the press system and including at least one processor and at least one memory. The memory stores instructions that, when executed by the at least one processor, cause the at least one processor to send commands to the mixing system, the commands causing the mixing system to supply mixture components including a first amount of cellulosic fragments and a second amount of PVC fragments to the mixer, and further causing the mixer to mix the mixture components to form a mixture. The instructions further cause the at least one processor to send commands to the press system, the commands causing the heated press to heat and compress at least a portion of the mixture.

In some embodiments, the mixture components further include plastic fragments other than PVC.

In some embodiments, the PVC fragments include at least one of flexible PVC or PVC-C.

In some embodiments, the system further includes a disintegration system including at least one of a shredder, granulator, mill, flaker, or grinder, wherein the instructions further cause the at least one processor to send a command to the disintegration system to disintegrate cellulosic elements to form cellulosic fragments and to disintegrate PVC elements to form PVC fragments, particles, or powders.

In some embodiments, the press system further includes a cold press, wherein the instructions further cause the at least one processor to send commands to the press system, the commands causing the cold press to cool and compress the at least a portion of the mixture after the heated press heats and compresses the at least a portion of the mixture.

In some embodiments, the system further includes a ventilation system configured to draw gas away from the press system.

In some embodiments, the system further includes at least one sensor operatively coupled to the controller and configured to measure at least one of a hydrogen chloride concentration or a dioxin concentration, wherein the instructions further cause the at least one processor to generate an alert when the hydrogen chloride concentration or the dioxin concentration exceeds a predetermined level.

In some embodiments, the system further includes a lockout system operatively coupled to the controller and configured to block human access to the press system, wherein the instructions further cause the at least one processor to activate the lockout system when the press system is active.

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub-combination. Moreover, although features may be described as acting in certain combinations and even initially claimed as such, one or more features from a claimed combination can, in some cases, be excised from the combination, and the claimed combination may be directed to a sub-combination or variation of a sub-combination.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of manufacturing a product, the method comprising:
   disintegrating PVC elements to form PVC fragments;
   disintegrating cellulosic elements to form cellulosic fragments;
   calculating an amount of at least one alkaline sequestering agent based on an amount of the PVC fragments, wherein the amount of the at least one alkaline sequestering agent exceeds an amount needed to stoichiometrically neutralize hydrogen chloride expected to be emitted by the PVC fragments during heating;
   forming a first mixture of the PVC fragments, the cellulosic fragments, the at least one alkaline sequestering agent, and at least one tackifying agent configured to maintain uniform distribution of the at least one alkaline sequestering agent throughout the first mixture;
   heating the first mixture at a temperature and duration sufficient to melt at least a portion of the PVC fragments and to cause the at least one alkaline sequestering agent to react with hydrogen chloride emitted from the PVC fragments to form a salt; and
   cooling the first mixture until the melted PVC fragments resolidify.

2. The method of claim 1, wherein the PVC fragments comprise at least one of flexible PVC or PVC-C.

3. The method of claim 2, wherein the cellulosic fragments comprise paper.

4. The method of claim 3, wherein the first mixture further comprises plastic fragments made of plastic materials other than PVC.

5. The method of claim 1, wherein a dry mass of the at least one alkaline sequestering agent comprises about 0.005 percent to about 10.0 percent of a dry mass of the first mixture.

6. The method of claim 1, wherein the at least one alkaline sequestering agent is non-volatile and forms non-volatile salts with hydrogen chloride.

7. The method of claim 1, wherein the at least one alkaline sequestering agent is in the form of a powder.

8. The method of claim 1, wherein the at least one alkaline sequestering agent comprises at least one of calcium carbonate, calcium hydroxide, calcium oxide, sodium carbonate, sodium bicarbonate, magnesium carbonate, magnesium hydroxide, magnesium oxide, potassium carbonate, potassium bicarbonate, and sodium salts of citric acid or tartaric acid.

9. The method of claim 1, further comprising forming a mat comprising the first mixture, wherein heating the first mixture comprises compressing the mat in a heated press.

10. The method of claim 9, further comprising determining an amount of the at least one alkaline sequestering agent to be included in the first mixture, wherein the amount of the at least one alkaline sequestering agent is based on an amount of PVC fragments in the first mixture, the temperature of the mat during pressing, and the time at which the mat is at elevated temperature during pressing.

11. The method of claim 1, wherein an average fragment size of the cellulosic fragments is less than about 0.020 inches, and wherein the PVC fragments comprise particles or a powder.

12. The method of claim 1, further comprising forming a second mixture of PVC fragments, cellulosic fragments, and at least one alkaline sequestering agent, wherein the first mixture comprises a first ratio of PVC fragments to cellulosic fragments, and the second mixture comprises a second ratio of PVC fragments to cellulosic fragments, the first ratio being different than the second ratio.

13. The method of claim 12, further comprising forming a mat including a first layer comprising the first mixture and a second layer comprising the second mixture, wherein heating the first mixture further comprises heating the second mixture at a temperature and duration sufficient to melt at least a portion of the PVC fragments in the second layer.

14. The method of claim 1, wherein a moisture content of the mixture is between about 1 percent and about 20 percent.

15. The method of claim 1 wherein the at least one tackifying agent comprises at least one of urea-formaldehyde, melamine-formaldehyde, or an acrylic resin derived from monomer mixtures that comprise butadiene.

16. A method of manufacturing a product, the method comprising:
  disintegrating PVC elements to form PVC fragments;
  disintegrating cellulosic elements to form cellulosic fragments;
  calculating an amount of at least one alkaline sequestering agent based on an amount of the PVC fragments, wherein the amount of the at least one alkaline sequestering agent exceeds an amount needed to stoichiometrically neutralize hydrogen chloride expected to be emitted by the PVC fragments during heating;
  mixing the PVC fragments, the cellulosic fragments, the at least one alkaline sequestering agent, and at least one tackifying agent to form a mixture, wherein the at least one tackifying agent is configured to maintain uniform distribution of the at least one alkaline sequestering agent throughout the mixture;
  heating the mixture at a temperature and duration sufficient to melt at least a portion of the PVC fragments and to cause the at least one alkaline sequestering agent to react with hydrogen chloride emitted from the PVC fragments to form a salt; and
  cooling the mixture until the melted PVC fragments resolidify.

17. The method of claim 16, wherein the PVC elements comprise at least one of flexible PVC elements or PVC-C elements.

18. The method of claim 16, wherein disintegrating the PVC elements comprises processing the PVC elements through at least one of a shredder, granulator, mill, flaker, or grinder.

19. The method of claim 16, wherein disintegrating the cellulosic elements comprises milling the cellulosic elements until disintegrated material passes through a screen with a predetermined mesh size.

20. The method of claim 16, wherein the cellulosic elements comprise at least one of paper, wood, cotton, grass, pulp fibers, or rayon fibers.

21. The method of claim 16, wherein the PVC elements are sourced from construction waste.

22. The method of claim 16, wherein calculating the amount of the at least one alkaline sequestering agent is further based on a temperature at which the mixture will be heated and a duration for which the mixture will be heated.

23. The method of claim 16, wherein the at least one alkaline sequestering agent comprises at least one of calcium carbonate, calcium hydroxide, magnesium carbonate, magnesium hydroxide, or sodium bicarbonate.

24. The method of claim 16, wherein the at least one tackifying agent comprises at least one of urea-formaldehyde, melamine-formaldehyde, or an acrylic resin with a glass transition temperature less than about 10° C.

25. The method of claim 16, further comprising forming a mat comprising the mixture, wherein heating the mixture comprises compressing the mat in a heated press.

26. The method of claim 25, further comprising positioning at least one facer layer adjacent to the mat before heating the mixture.

27. The method of claim 16, wherein the PVC elements comprise flexible PVC with a plasticizer content of about 20 percent to about 60 percent.

* * * * *